(12) United States Patent
Suzuki

(10) Patent No.: US 8,281,629 B2
(45) Date of Patent: Oct. 9, 2012

(54) METHOD OF PRODUCING RING MEMBER

(75) Inventor: Yuji Suzuki, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 151 days.

(21) Appl. No.: 12/812,695

(22) PCT Filed: Jan. 16, 2009

(86) PCT No.: PCT/IB2009/000168
§ 371 (c)(1),
(2), (4) Date: Jul. 13, 2010

(87) PCT Pub. No.: WO2009/090552
PCT Pub. Date: Jul. 23, 2009

(65) Prior Publication Data
US 2010/0288010 A1 Nov. 18, 2010

(30) Foreign Application Priority Data
Jan. 18, 2008 (JP) .................. 2008-009142

(51) Int. Cl.
*B21D 39/02* (2006.01)
*B21D 51/28* (2006.01)
(52) U.S. Cl. .................. 72/51; 72/71; 72/341
(58) Field of Classification Search .............. 72/71, 341, 72/51
See application file for complete search history.

(56) References Cited

U.S. PATENT DOCUMENTS

| | | | | |
|---|---|---|---|---|
| 4,433,965 A | * | 2/1984 | Hattori et al. | 474/201 |
| 7,294,077 B2 | * | 11/2007 | Wang et al. | 474/201 |
| 2002/0019283 A1 | * | 2/2002 | Mitsubayashi et al. | 474/272 |

FOREIGN PATENT DOCUMENTS

| | | |
|---|---|---|
| EP | 0 107 218 A | 5/1984 |
| JP | 2003-041345 A | 2/2003 |
| JP | 2006-124757 A | 5/2006 |
| JP | 2007-152358 A | 6/2007 |
| JP | 2007-296599 A | 11/2007 |
| WO | WO 2007/133062 A | 11/2007 |

* cited by examiner

*Primary Examiner* — Bena Miller
(74) *Attorney, Agent, or Firm* — Kenyon & Kenyon LLP

(57) ABSTRACT

A method of producing a ring member includes a cutting process in which a rectangular sheet is formed by cutting a strip-shaped material pulled out from a coiled material; a joining process in which opposite edges of the sheet are butted, and a cylindrical member is formed by joining the edges to each other; and a ring formation process in which a ring member is formed by cutting the cylindrical member in a direction perpendicular to an axis of the cylindrical member. In the cutting process, the strip-shaped material is i) cut along one of a first section line parallel to an edge of the strip-shaped material facing a direction in which the strip-shaped material is pulled, or a second section line perpendicular to the edge, and then ii) cut along the other of the first or second section line, that is perpendicular to the line previously cut.

6 Claims, 6 Drawing Sheets

METHOD OF PRODUCING RING MEMBER

This is a 371 national phase application of PCT/IB2009/000168 filed 16 Jan. 2009, claiming priority to Japanese Patent Application No. 2008-009142 filed 18 Jan. 2008, the contents of which are incorporated herein by reference.

BACKGROUND OF THE INVENTION

1. Field of the Invention

The invention relates to a method of producing a ring member, and particularly relates to a method of producing a ring member used to form, for example, an endless metal belt (power transmission belt) of a continuously variable transmission.

2. Description of the Related Art

In general, when a ring member used to form an endless metal belt (power transmission belt) of a Continuously Variable Transmission (CVT) is produced, first, a sheet material is cut out of a coiled material. The cut-out sheet material is rolled into a cylindrical shape, and butt portions are welded. Thus, a cylindrical member is formed. A plurality of ring members is then obtained by cutting the cylindrical member in the direction perpendicular to the axis of the cylindrical member so that each piece has a predetermined width, i.e., by cutting the cylindrical member into ring-shaped pieces (e.g., refer to Japanese Patent Application Publication No. 2006-124757 (JP-A-2006-124757)).

The plane surface of a strip-shaped material pulled out from the coiled material generally has undulated edges as shown in FIG. 8. When each sheet material 4 is cut out, a strip-shaped material 3 is generally cut along a pair of section lines, for example, A1, A1; A2, A2; or A3, A3. The paired section lines are parallel to each other. In this case, a member 14 between the sheet material 4 and the sheet material 4 is treated as scrap, resulting in a poor yield rate and an increase in production cost. Each sheet material 4 cut out in the above manner has the pair of the opposing section lines, for example, A1, A1; A2, A2; or A3, A3. The opposing section lines of each sheet material 4 are joined to each other by butt welding. However, because squareness between an edge face S3 of the strip-shaped material 3 and each of the section lines A1, A2, A3, and the like is not achieved, when this sheet material 4 is formed into a cylindrical shape, the required accuracy of this cylindrical member cannot be obtained. In other words, both ends of the cylindrical member are uneven, or the edge faces of both ends are not parallel to each other. Therefore, both ends of the cylindrical member also need to be treated as scrap, resulting in further deterioration of the yield rate.

SUMMARY OF THE INVENTION

The invention provides a method of producing a ring member, which reduces production cost by improving a yield rate when a sheet material is formed by cutting a strip-shaped material pulled out from a coiled material.

A first aspect of the invention relates to a method of producing a ring member. The method includes a cutting process in which a rectangular sheet material is formed by cutting a strip-shaped material pulled out from a coiled material; a joining process in which opposite edges of the sheet material are butted, and a cylindrical member is formed by joining the edges to each other; and a ring formation process in which a ring member with a ring shape is formed by cutting the cylindrical member in a direction perpendicular to an axis of the cylindrical member. In the cutting process, i) the strip-shaped material is cut along one of a first section line parallel to a reference section line that is an edge of the strip-shaped material facing a direction in which the strip-shaped material is pulled, or a second section line perpendicular to the reference section line, and then ii) the strip-shaped material is cut along the other of the first section line or the second section line, that is perpendicular to the line previously cut.

According to the method of producing a ring member in the above-mentioned first aspect, the sheet material cut out in the cutting process is a substantially quadrangle surrounded by three section lines (the reference section line, the first section line, and the second section line) that are straight lines, and one non-section line that is an undulated line. Among the three section lines, it is possible to achieve squareness between each pair of the section lines that meet at a vertex, i.e., each pair of the section lines that lie adjacent to each other.

In the first aspect, in the joining process, the reference section line and the first section line of the sheet material formed in the cutting process may be butted so as to match a vertex at which the reference section line and the second section line meet with a vertex at which the first section line and the second section line; and the reference section line and the first section line, which are butted, may be welded in a direction from an uncut end portion that is opposite to the second section line, toward the two matched vertices. In the butt welding, a welding starting portion is likely to become dented into a groove shape, and therefore, it is difficult to ensure the weld quality of the welding starting portion. According to the method of producing a ring member described herein, this welding starting portion is formed on the uncut end portion of the cylindrical member formed in the joining process, i.e., the portion that eventually becomes scrap.

In the first aspect, in the ring formation process, the end portion of the cylindrical member formed in the joining process may be clamped. The uncut end portion is opposite to the second section line. According to the aspect, in the ring formation process, cutting is performed while the uncut end portion of the cylindrical member, which is undulated, is being clamped. That is, the cylindrical member is cut in the direction perpendicular to the axis of the cylindrical member while the portion, on which the welding starting portion is formed, and which eventually becomes scrap, is being clamped. Because sufficient accuracy of the end portion opposite to the uncut end portion (e.g., sufficient flatness of the edge face opposite to the uncut end portion or sufficient squareness of the edge face to the axis) and sufficient weld quality of the end portion are ensured, the entire cylindrical member other than the clamped portion, i.e., the uncut end portion of the cylindrical member, can be used as products, resulting in an improvement of the yield rate. In the aspect herein, the cylindrical member may be cut (in the direction perpendicular to the axis of the cylindrical member) using, for example, a press die, while the uncut end portion is being clamped.

In the above-mentioned aspect, in the cutting process, the strip-shaped material that has a width twice as wide as a height of the cylindrical member to be formed in the joining process may be cut at a cutting length equal to a circumferential length of a cross section of the cylindrical member, along the first section line parallel to the reference section line; and the cut-out sheet material, which has the width twice as wide as the height of the cylindrical member, may be bisected by cutting the sheet material along the second section line. According to the method of producing a ring member in the aspect, the sheet material cut out in the cutting process is formed into a substantially quadrangle surrounded by three section lines (the reference section line, the first section line, and the second section line) that are straight lines, and one non-section line that is an undulated line. Among the three section lines, it is possible to achieve squareness between each pair of the section lines that meet at the vertex, i.e., each pair of the section lines that lie adjacent to each other (that is, it is possible to achieve squareness between the reference section line and the second section line, and squareness between the first section line and the second section line).

Furthermore, in the above-mentioned aspect, in the cutting process, the strip-shaped material that has a width twice as wide as a height of the cylindrical member to be formed in the joining process may be cut along the second section line that is perpendicular to the reference section line, and that passes through a center of the reference section line, and then, the strip-shaped material may be sequentially cut at a cutting length equal to a circumferential length of a cross section of the cylindrical member, along the first section line parallel to the reference section line and perpendicular to the second section line. According to the production method in the aspect, the sheet material cut out in the cutting process is a substantially quadrangle surrounded by three section lines (the reference section line, the first section line, and the second section line, or the second section line and the two first section lines) that are straight lines, and one non-section line that is an undulated line. Among the three section lines, it is possible to achieve squareness between each pair of the section lines that meet at the vertex, i.e., each pair of the section lines that lie adjacent to each other (that is, it is possible to achieve squareness between the reference section line and the second section line, and squareness between the first section line and the second section line; or squareness between each of the first section lines and the second section line).

A second aspect of the invention relates to a method of forming a rectangular sheet material by cutting a strip-shaped material pulled out from a coiled material. In other words, a second aspect of the invention relates to a method of cutting a coiled material in which a strip-shaped material pulled out from a coiled material that has a width twice as wide as a width of a sheet material is cut at a predetermined cutting length, along a first section line parallel to a reference section line at an end of the strip-shaped material in a direction in which the strip-shaped material is pulled, and then, the cut-out sheet material is bisected by cutting the sheet material along a second section line perpendicular to the reference section line and the first section line. According to the method of cutting a coiled material in the aspect, the cut-out sheet material is a substantially quadrangle surrounded by three section lines (the reference section line, the first section line, and the second section line) that are straight lines, and one non-section line that is an undulated line. Among the three section lines, it is possible to achieve squareness between each pair of the section lines that meet at a vertex, i.e., each pair of the section lines that lie adjacent to each other (that is, it is possible to achieve squareness between the reference section line and the second section line, and squareness between the first section line and the second section line).

A third aspect of the invention relates to a method of forming a rectangular sheet material by cutting a strip-shaped material pulled out from a coiled material. In other words, the third aspect of the invention relates to a method of cutting a coiled material in which a strip-shaped material pulled out from a coiled material that has a width twice as wide as a width of a sheet material is cut along a second section line that is perpendicular to a reference section line at an end of the strip-shaped material in a direction in which the strip-shaped material is pulled, and that passes through a center of the reference section line; and then, the strip-shaped material is sequentially cut at a predetermined cutting length, along a first section line parallel to the reference section line and perpendicular to the second section line. According to the method of cutting a coiled material in the aspect, the cut-out sheet material is a substantially quadrangle surrounded by three section lines (the reference section line, the first section line, and the second section line, or the second section line and the two first section lines) that are straight lines, and one non-section line that is undulated line. Among the three section lines, it is possible to achieve squareness between each pair of the section lines that meet at a vertex, i.e., each pair of the section lines that lie adjacent to each other (that is, it is possible to achieve squareness between the reference section line and the second section line, and squareness between the first section line and the second section line, or squareness between each of the first section lines and the second section line).

According to the abovementioned aspects, it is possible to provide the method of producing a ring member, which reduces production cost by improving the yield rate when the sheet material is formed by cutting the strip-shaped material pulled out from the coiled material.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
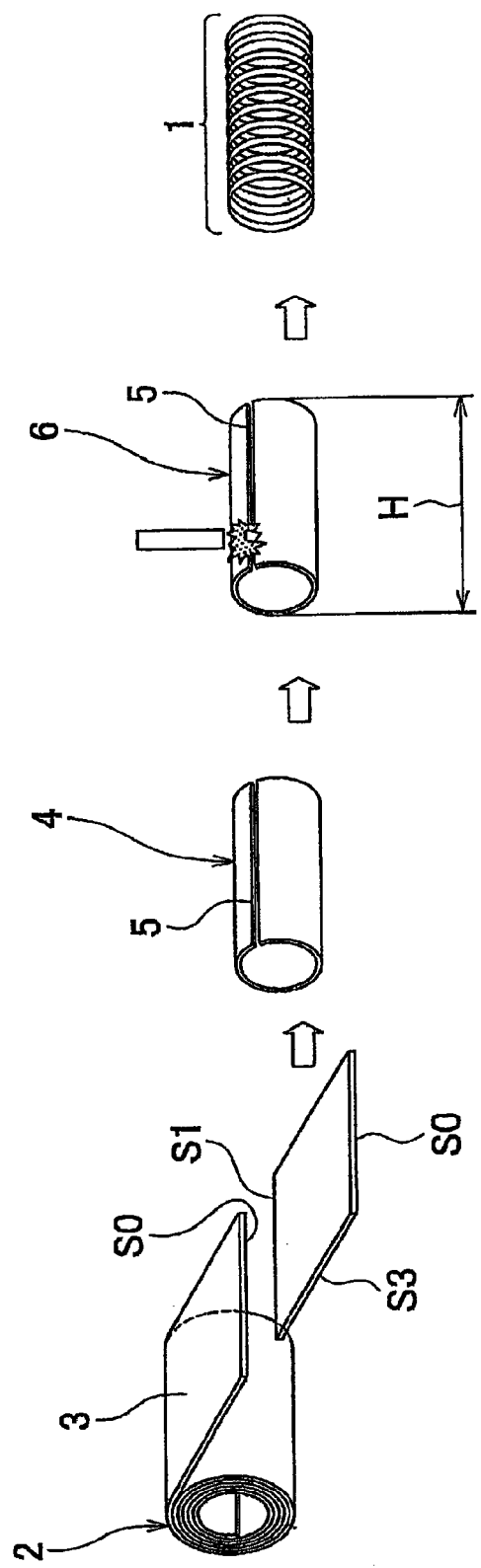
FIGS. 1A to D are diagrams showing the flow of a production process for ring members.
Figure 2:
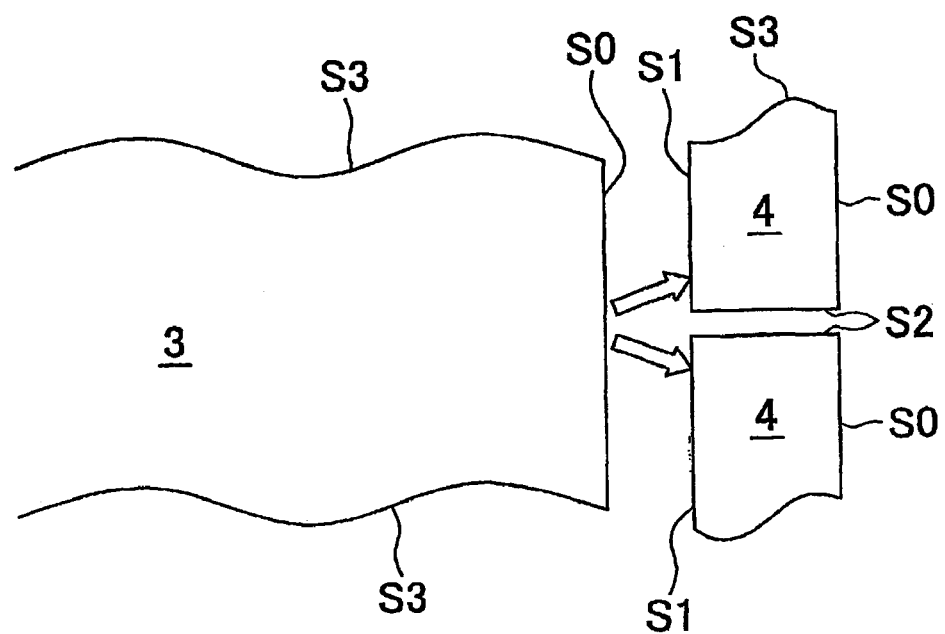
FIG. 2 is an illustration diagram of a cutting process in an embodiment showing a sheet material that is cut out of a strip-shaped material pulled out from a coiled material.

An embodiment of the invention will be described with reference to FIGS. 1 to 5. In the embodiment, a method of producing ring members 1 (refer to FIG. 1D), each of which is used to form an endless metal belt (power transmission belt) of a continuously variable transmission for a vehicle will be described. The method of producing ring members 1 in the embodiment includes a cutting process in which a rectangular sheet material 4 is formed by cutting a strip-shaped material 3 pulled out from a coiled material 2 (refer to FIG. 1A); a rolling process in which the sheet material 4, which is formed in the cutting process, is rolled into a cylindrical shape (refer to FIG. 1B); a joining process in which butt portions 5 of the sheet material 4, which is formed into a cylindrical shape in the rolling process (refer to FIG. 1C), are welded to each other; and a ring formation process in which the cylindrical member 6, which is formed in the joining process, is cut in a direction perpendicular to the axis of the cylindrical member 6 (refer to FIG. 1D).

The cutting process includes a first cutting process in which the strip-shaped material 3 pulled out from the coiled material 2 is cut along a first section line S1 parallel to a reference section line S0 that is the edge of the strip-shaped material 3 on a side facing the direction in which the strip-shaped material 3 is pulled (rightward in FIG. 2); and a second cutting process in which the strip-shaped material 3 is cut along a second section line S2 perpendicular to the reference section line S0 and the first section line S1. Thus, in the method of producing the ring members 1 in the embodiment, the sheet material 4 cut out in the cutting process is a quadrangle surrounded by the three section lines S0, S1, and S2 that are straight lines, and one non-section line S3 that is an undulated line. Among the three section lines S0, S1, and S2, it is possible to achieve squareness between each pair of the section lines that meet at a vertex, i.e., each pair of the section lines that lie adjacent to each other (in the embodiment, it is possible to achieve squareness between the reference section line S0 and the second section line S2 that meet at a vertex P1, and squareness between the first section line S1 and the second section line S2 that meet at a vertex P2).

Figure 3:
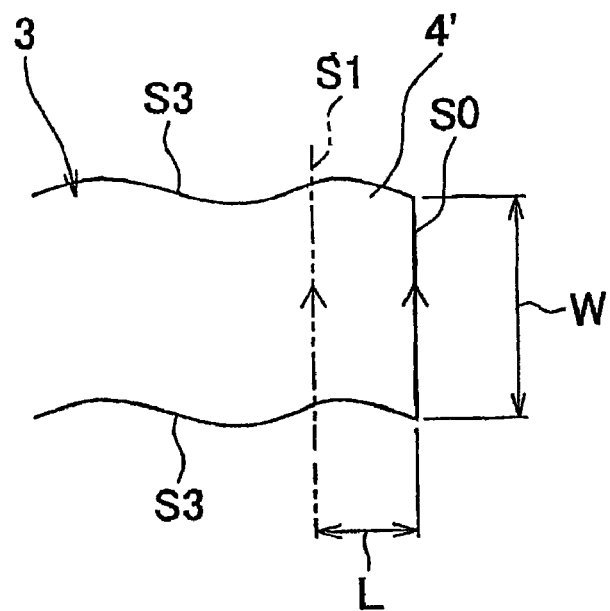
FIG. 3 is an illustration diagram of the cutting process in the embodiment particularly showing a first cutting process.

The method of producing the ring members 1 in the embodiment will be described in detail below. In the cutting process, first, the end portion of the strip-shaped material 3 pulled out from the coiled material 2, which is a high-tensile steel plate made of maraging steel, is cut, and the reference section line S0 is formed at this end portion. The width W of the coiled material 2 is twice as wide as the height H of a cylindrical member 6 to be formed in the after-mentioned joining process (W=2H). Subsequently, as shown in FIG. 3, the strip-shaped material 3 pulled out from the coiled material 2 is cut at a cutting length L, along the first section line S1 parallel to the reference section line S0 (first cutting process). The cutting length L is equal to the circumferential length of a circular cross section of the cylindrical member 6 to be obtained in the after-mentioned joining process.

Figure 4:
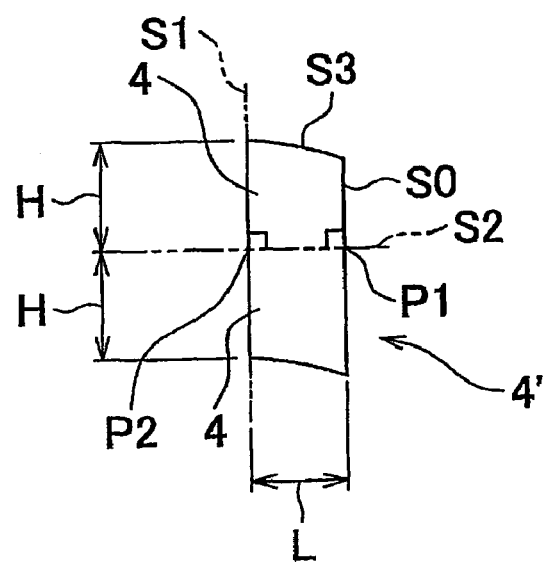
FIG. 4 is an illustration diagram of the cutting process in the embodiment particularly showing a second cutting process.
Figure 5:
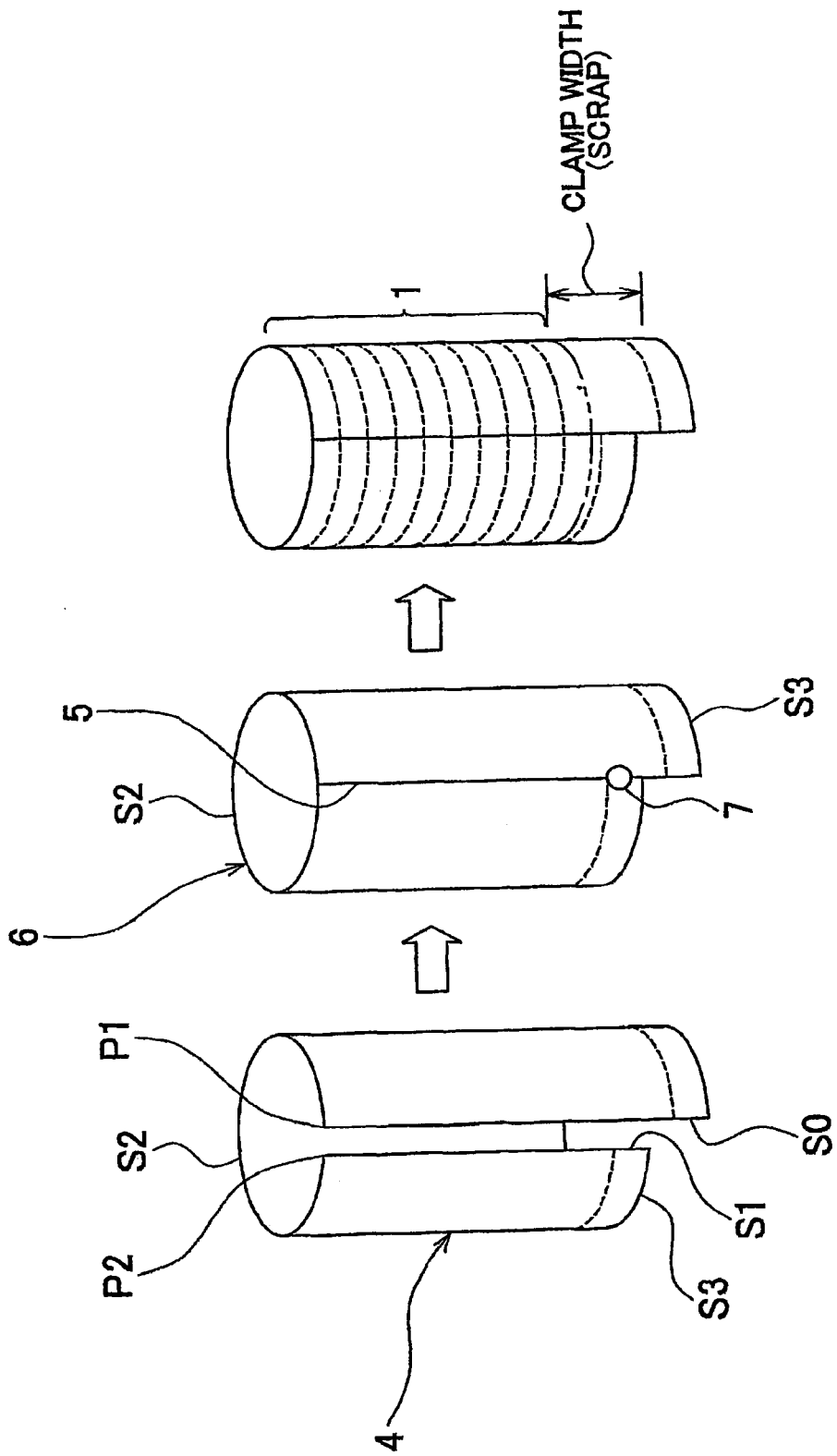
FIG. 5A is a diagram showing a sheet material in a rolling process in the embodiment.
FIG. 5B is a diagram showing the sheet material in a joining process in the embodiment.
FIG. 5C is a diagram showing the sheet material in a ring formation process in the embodiment.

Subsequently, as shown in FIG. 4, a sheet material 4' (horizontal and vertical lengths: W×L), which is obtained in the first cutting process, and which has the width twice as wide as the height of the cylindrical member 6, is bisected by cutting the sheet material 4' along the second section line S2 perpendicular to the reference section line S0 and the first section line S1 (second cutting process). This makes it possible to obtain the above-mentioned two quadrangular pieces of sheet material 4. Each sheet material 4 is surrounded by the three section lines S0, S1, and S2, and one non-section line S3 that is the undulated line. In the cutting process, the end portion of the strip-shaped material 3 cut in the first cutting process sequentially becomes the reference section line S0, and the cutting is performed thereafter.

In the rolling process, the sheet material 4 obtained in the cutting process is rolled. More specifically, paired section lines that are opposite edges of the sheet material 4, i.e., the reference section line S0 and the first section line S1, are butted so as to match the vertex P1 at which the section lines S0 and the second section line S2 (the other section line) meet with the vertex P2 at which the first section line S1 and the second section line S2 meet (refer to FIGS. 4 and 5A). The second section line S2 is perpendicular to each of these section lines S0 and S1. The rolling process is separate from the joining process. However, the rolling process may be included in the after-mentioned joining process, that is, the rolling process may be performed in the joining process.

In the joining process, butt portions 5 of the substantially cylindrical member (refer to FIG. 5A) obtained in the rolling process are welded in a direction from the non-section line S3-side (the uncut end portion, which is the bottom portion in FIG. 5B) toward the second section line S2-side (by TIG welding in the embodiment). This makes it possible to obtain the cylindrical member 6 which includes a welding starting portion 7 at the non-section line S3-side, and in which sufficient accuracy of the end portion at the second section line S2-side (i.e., sufficient flatness of the end portion, and sufficient squareness of the end portion to the axis) is ensured. The second section line S2-side is opposite to the non-section line S3-side.

In the ring formation process, the non-section line S3-side (the uncut end portion, which is the bottom portion in FIG. 5C) of the cylindrical member 6 obtained in the joining process is clamped, and in this state, the cylindrical member 6 is cut in the direction perpendicular to the axis of the cylindrical member 6 so that each piece has a predetermined size. This makes it possible to obtain the ring members 1. However, in the embodiment, the ring formation process is performed using a press die. In addition, the clamped portion of the cylindrical member 6, which includes the welding starting portion 7, is treated as scrap.

In this embodiment, it is possible to obtain the following effects. According to the embodiment, the method of producing the ring members 1 includes the first cutting process in which the strip-shaped material 3 pulled out from the coiled material 2 is cut along the first section line S1 parallel to the reference section line S0 at the end of the strip-shaped material; and the second cutting process in which the strip-shaped material 3 is cut along the second section line S2 perpendicular to the reference section line S0 and the first section line S1. Thus, the sheet material 4 cut out in the cutting process that includes the first cutting process and the second cutting process is a quadrangle surrounded by the three section lines S0, S1, and S2 that are the straight lines, and one non-section line S3 that is the undulated line. Among the three section lines S0, S1, and S2, it is possible to achieve squareness between each pair of the section lines that meet at the vertex, i.e., each pair of the section lines that lie adjacent to each other (in the embodiment, it is possible to achieve squareness between the reference section line S0 and the second section line S2 that meet at the vertex P1, and squareness between the first section line S1 and the second section line S2 that meet at the vertex P2). Furthermore, unlike the related art, no scrap is generated between the cut-out sheet material 4 and the cut-out sheet material 4, and therefore, the yield rate of the material can be improved to a large extent. In addition, in the rolling process, the paired section lines of the sheet material 4 obtained in the cutting process, which are opposite edges, i.e., the reference section line S0 and the first section line S1, are butted so as to match the vertex P1 at which the section lines S0 and the second section line S2 meet (the other section line) with the vertex P2 at which the first section line S1 and the second section line S2 meet. The second section line S2 is perpendicular to each of these section lines S0 and S1. In the joining process, the butt portions 5 of the substantially cylindrical member obtained in the rolling process are welded in the direction from the non-section line S3-side (the uncut end portion) toward the second section line S2-side. This makes it possible to obtain the cylindrical member 6 which includes the welding starting portion 7 at the non-section line S3-side, and in which sufficient accuracy of the end portion at the second section line S2-side (i.e., sufficient flatness of the end portion, and sufficient squareness of the end portion to the axis) is ensured. The second section line S2-side is opposite to the non-section line S3-side. Furthermore, in the ring formation process, the non-section line S3-side (the uncut part side) of the cylindrical member 6 obtained in the joining process is clamped, and in this state, the cylindrical member 6 is cut in the direction perpendicular to the axis of the cylindrical member 6 at the predetermined cutting length. This makes it possible to use the entire cylindrical member 6 other than the clamped portion as products (ring members 1), resulting in further improvement of the yield rate.

Figure 6:
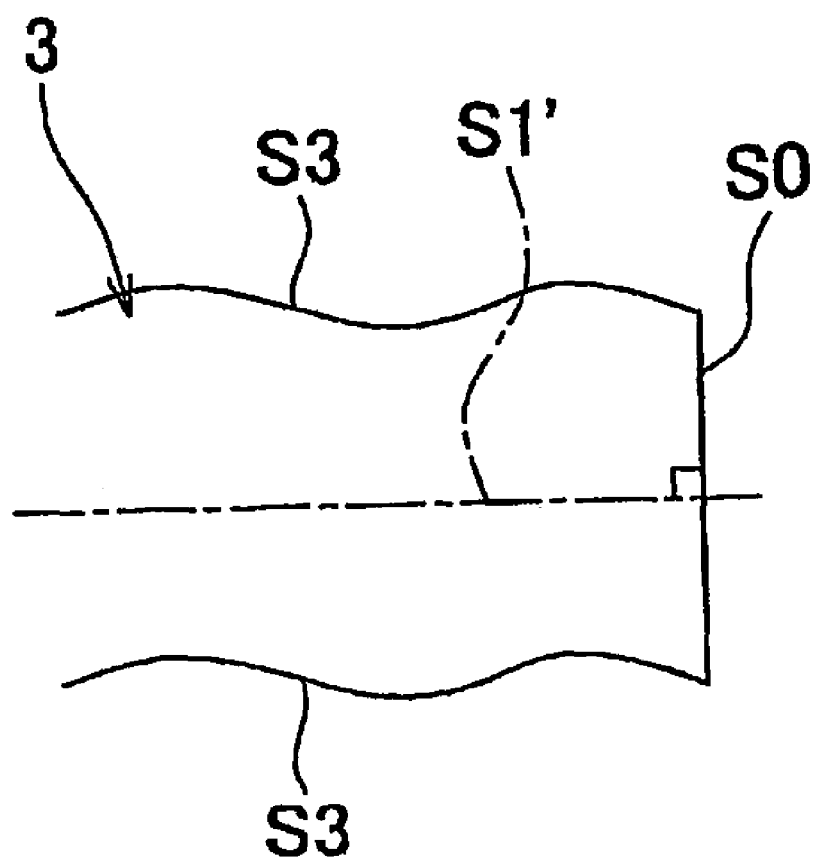
FIG. 6 is an illustration diagram of a cutting process in another embodiment particularly showing a first cutting process.
Figure 7:
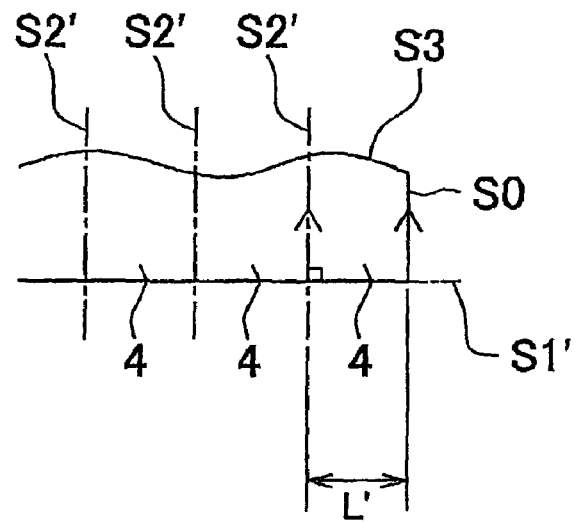
FIG. 7 is an illustration diagram of the cutting process in the other embodiment particularly showing a second cutting process.
Figure 8:
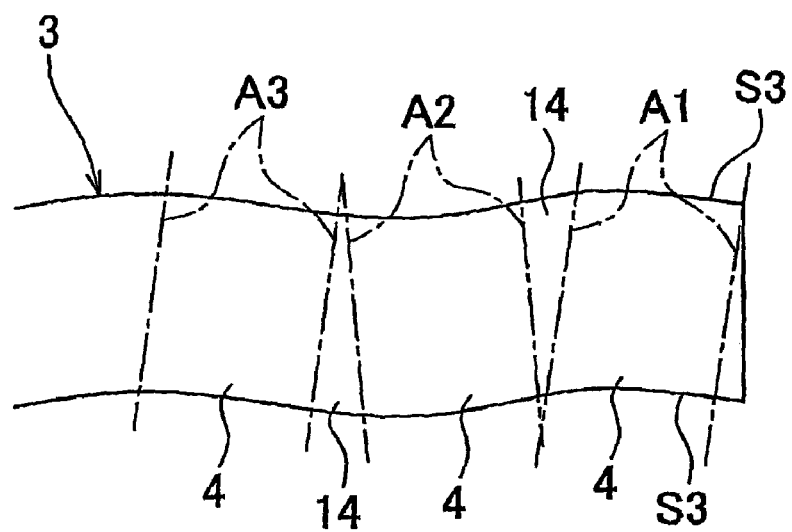
FIG. 8 is a diagram showing a yield rate in related art.

The invention is not limited to the above-described embodiment, and for example, the following configuration may be made. As shown in FIG. 6, in the cutting process, the strip-shaped material 3 pulled out from the coiled material 2 having a width twice as wide as the height H of the cylindrical member 6 to be formed in the joining process (refer to FIG. 1C) is cut along a first section line S1' that is perpendicular to the reference section line S0, and that passes through the center of the reference section line S0 (first cutting process). Subsequently, as shown in FIG. 7, this material 3 is sequentially cut at a cutting length L' (L'=L), along a second section line S2' parallel to the reference section line S0 and perpendicular to the first section line S1' (second cutting process). This makes it possible to obtain the same effects as those obtained in the above-mentioned embodiment. The cutting length L' is equal to the circumferential length of the circular section of the cylindrical member 6 obtained in the joining process.

In the present embodiment, in the cutting process, the strip-shaped material may be cut, for example, using a cutting die attached to a press machine, by shearing, or by laser, as appropriate. Also, although the butt portions are welded by TIG welding in the embodiment, the butt portions may be welded, for example, by MAG welding or by laser welding, as appropriate.

The invention claimed is:

1. A method of producing a ring member comprising:
   a cutting process in which a rectangular sheet material is formed by cutting a strip-shaped material pulled out from a coiled material;
   a joining process in which opposite edges of the sheet material are butted, and a cylindrical member is formed by joining the edges to each other; and
   a ring formation process in which a ring member with a ring shape is formed by cutting the cylindrical member in a direction perpendicular to an axis of the cylindrical member,
   wherein, in the cutting process,
   i) the strip-shaped material is cut along one of a first section line parallel to a reference section line that is an edge of the strip-shaped material facing a direction in which the strip-shaped material is pulled, or a second section line perpendicular to the reference section line, and then
   ii) the strip-shaped material is cut along the other of the first section line or the second section line, that is perpendicular to the line previously cut, and
   wherein the cutting process is performed before the joining process.

2. The method according to claim 1, wherein
   in the ring formation process, an uncut end portion of the cylindrical member formed in the joining process is clamped, the uncut end portion being opposite to the second section line.

3. The method according to claim 1, wherein
   in the cutting process, the strip-shaped material that has a width twice as wide as a height of the cylindrical member to be formed in the joining process is cut at a cutting length equal to a circumferential length of a cross section of the cylindrical member, along the first section line parallel to the reference section line; and
   the cut-out sheet material, which has the width twice as wide as the height of the cylindrical member, is bisected by cutting the sheet material along the second section line.

4. The method according to claim 1, wherein
   in the cutting process, the strip-shaped material that has a width twice as wide as a height of the cylindrical member to be formed in the joining process is cut along the second section line that is perpendicular to the reference section line, and that passes through a center of the reference section line, and then, the strip-shaped material is sequentially cut at a cutting length equal to a circumferential length of a cross section of the cylindrical member, along the first section line parallel to the reference section line and perpendicular to the second section line.

5. A method of producing a ring member comprising:
   a cutting process in which a rectangular sheet material is formed by cutting a strip-shaped material pulled out from a coiled material;
   a joining process in which opposite edges of the sheet material are butted, and a cylindrical member is formed by joining the edges to each other; and
   a ring formation process in which a ring member with a ring shape is formed by cutting the cylindrical member in a direction perpendicular to an axis of the cylindrical member,
   wherein the cutting process includes a first cutting process in which the strip-shaped material is cut along a first section line parallel to or perpendicular to a reference section line that is an edge of the strip-shaped material on a side facing a direction in which the strip-shaped material is pulled, and includes a second cutting process in which the strip-shaped material is cut along a second section line perpendicular to the first section line, and
   wherein the cutting process is performed before the joining process.

6. A method of producing a ring member comprising:
   a cutting process in which a rectangular sheet material is formed by cutting a strip-shaped material pulled out from a coiled material;
   a joining process in which opposite edges of the sheet material are butted, and a cylindrical member is formed by joining the edges to each other; and
   a ring formation process in which a ring member with a ring shape is formed by cutting the cylindrical member in a direction perpendicular to an axis of the cylindrical member,
   wherein, in the cutting process,
   i) the strip-shaped material is cut along one of a first section line parallel to a reference section line that is an edge of the strip-shaped material facing a direction in which the strip-shaped material is pulled, or a second section line perpendicular to the reference section line, and then ii) the strip-shaped material is cut along the other of the first section line or the second section line, that is perpendicular to the line previously cut, wherein in the joining process, the reference section line and the first section line of the sheet material formed in the cutting process are butted so as to match a vertex at which the reference section line and the second section line meet with a vertex at which the first section line and the second section line meet; and the reference section line and the first section line are welded to each other from an uncut end portion that is opposite to the second section line, toward the two matched vertices.

\* \* \* \* \*